May 31, 1960
E. W. ROBERTS, JR
2,938,941
VENTILATED CONDUIT RISER CAP
Filed May 6, 1957
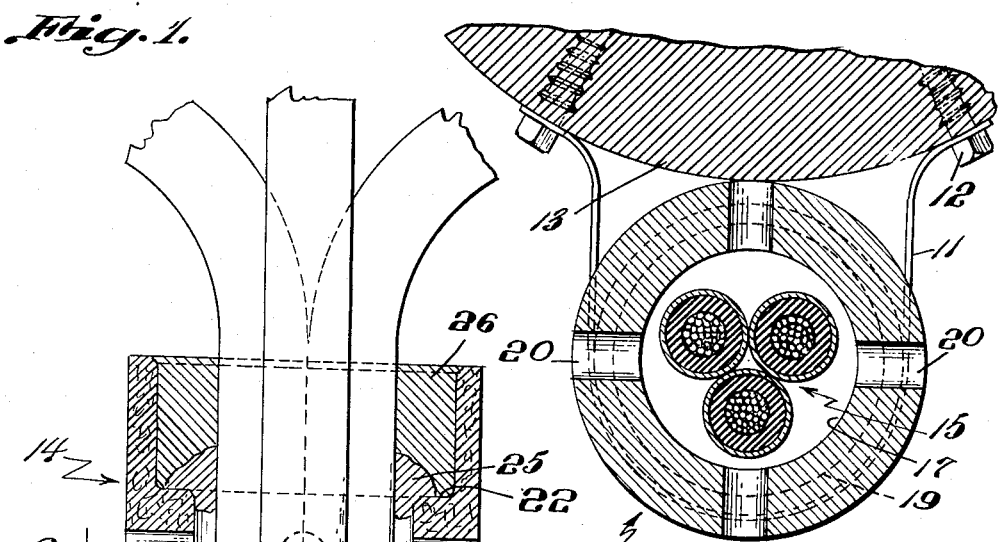
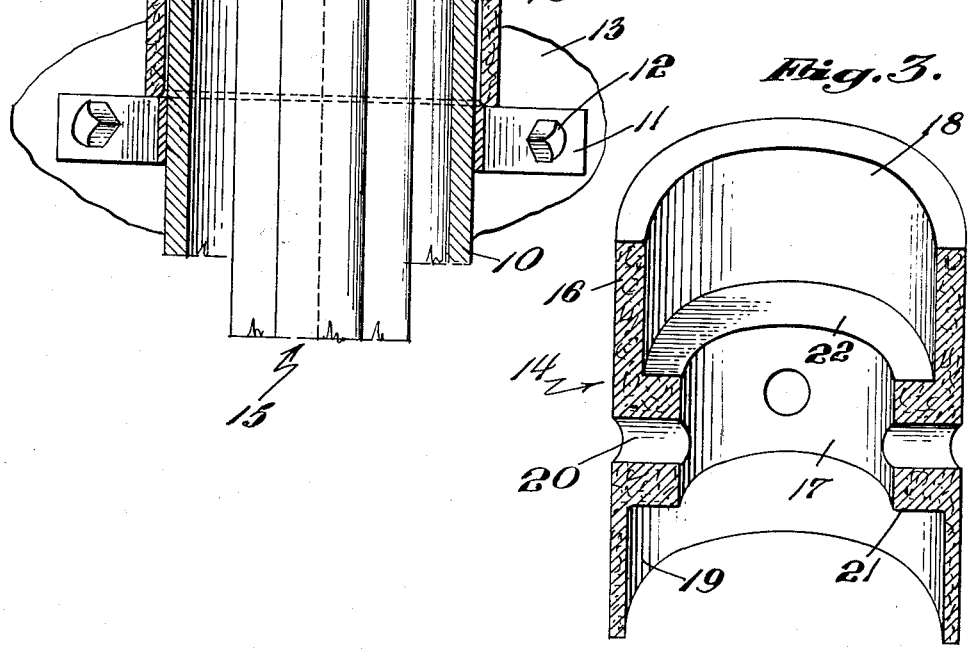
INVENTOR.
Earl W. Roberts, Jr.
BY
Barlow & Barlow
ATTORNEYS.

United States Patent Office 2,938,941
Patented May 31, 1960

2,938,941

VENTILATED CONDUIT RISER CAP

Earl W. Roberts, Jr., 122 Calaman Road, Cranston, R.I.

Filed May 6, 1957, Ser. No. 657,260

1 Claim. (Cl. 174—82)

This invention relates to conduits for electric cables and, more particularly, to caps for vertically disposed conduits which are known in the industry as conduit risers.

A conduit riser is generally installed against a vertical pole and is part of a system which connects underground electric wiring with overhead wiring. The common installation is to utilize some form of conduit from a manhole or vault to the face of the riser pole and continue this duct up the pole to the adjacent crossarm assembly near the top thereof. The cables used in such service are generally lead sheathed but may have outer jackets of other materials such as neoprene or polyvinyl chloride. The lead sheathed cables terminate on one of the crossarms atop the pole at a device that is known in the trade as a pot head, and which takes the form of an insulated terminal to which connections may be made. No mechanical strain should be transmitted to the pot head by the weight of the cable.

Since the ordinary riser pole is at least thirty feet above the ground to the terminal crossarm, it will be apparent that some means of support is advantageous for the cable. Various means have been used in the past such as the cable support shown in U.S. Patent No. 2,681,781 or alternately lead straps have been used to secure the cable to the pole; and, in some instances, a wiped joint has been used at the top of the riser to in effect provide a flange that is part of the cable and rests on the end of the riser.

It will be apparent that, with an exposed conduit riser as described, such a riser is susceptible to heating merely by exposure to sun. Additional heat is generated within the cables when they carry electrical current. When such is the case, the temperature in the conduit riser will be greater than if the conduit were buried in the ground or kept in a shaded area. The current capacity tables of the IPCEA, which are an accepted industry standard, relate the current carrying capacity of any given cable to the ambient temperature in which it is operating. It stands to reason, therefore, that if the temperature could be reduced in the conduit riser, a greater current carrying capacity would be permissible for any given size of cable.

One way in which the ambient temperature within a riser might be reduced would be to ventilate the conduit riser by providing a means at the top thereof which would exhaust air, there being a natural circulation present from the manhole or transformer vault to the top of the pole. If a ventilated riser were utilized with such a termination, an added advantage accrues, namely, the transformer vault or manhole is itself ventilated. This gives rise to several advantages, namely, the collection of moisture within the manhole is dissipated at a greater rate than if no ventilation is provided; and also if any gases tend to accumulate in the underground installation, such as a transformer vault or manhole, these gases would be vented to the atmosphere and thus reduce any danger of explosions from such an accumulation. Tests have indicated that the cables are dryer in a ventilated conduit than in a sealed conduit where condensation is present. Thus, lead sheathed cables will be less vulnerable to electrolytic or galvanic corrosion attack in a ventilated conduit.

In the development of a suitable ventilation cap for a conduit riser, there are certain factors that should be considered. First, the ventilation means in use should be of such a design that a minimum amount of moisture from precipitation will enter the termination. Secondly, it is advisable to provide some support means for the cables which would be simple and yet effective; and thirdly, the device should be light and self-supporting on the end of the conduit. Also of importance for field use, the termination device should preferably be of a structure to be universal in application and, that is, it should be able to be affixed to either rigid conduit, Transite or fiber duct, and should be a structure which may be readily installed in the field without the use of any special tools or equipment or time-consuming operations.

It is, therefore, a main object of the present invention to provide a conduit riser termination which will fulfill the above mentioned conditions.

A further object of the invention is to provide a device which may be readily and cheaply manufactured and which will readily support a cable in a conduit without danger of damage to the cable as well as to provide a means for sealing an unlimited number and size of cables to the termination thus preventing the entry of moisture.

With these and other objects in view, the invention consists of certain novel features of construction, as will be more fully described and particularly pointed out in the appended claim.

Referring now to the drawings:

Fig. 1 is an elevational view partially in section of a riser cap constructed in accordance with this invention;

Fig. 2 is a sectional view taken on lines 2—2 of Fig. 1; and

Fig. 3 is a perspective view in section showing the riser cap of the invention.

Referring to the drawings, the reference character 10 indicates the upper end of a standard type of conduit riser which would be secured to a pole by a suitable U strap 11 and lag bolts 12 which would engage the pole 13. Resting on the top of the riser 10 is a cap 14 through which extends the emerging portion of electric cables 15 that are drawn through the conduit and extend as described above from either a manhole or transformer vault to pothead or other aerial terminations. The cap 14 consists of a cylindrical wall section 16 with an internal annular ring 17 that is preferably integral with the wall 16. The annular ring 17 is centrally disposed axially of the wall 16, the cap having a bore 18 on one side of the ring 17 of a certain size and a bore 19 on the other side of the ring 17 of a still larger size. Radial holes 20 are provided through the annular ring 17 at spaced locations, there being shown four such holes in the embodiment disclosed. It will be understood, of course, that any number of holes may be provided, the diameter and combined area thereof being such as to give adequate passage of air therethrough for the purpose. Ventilated louvers may be inserted in the openings if required. As noted above, there are three types of conduits in use, namely, fiber duct, cementitious asbestos, sold under the trade name "Transite" and metal pipe. The trade diameters, particularly the external diameters, of these three products vary so that in general they fall into two groups, the fiber ducts having a smaller outside diameter than either the Transite or metal pipe. In the instant embodiment, the conduit riser 10 is shown to be metal pipe and to that end, the larger bore 19 is utilized to slip over this metal pipe, the wall 21 of the annular ring 17 seating on top of the metal pipe. If, per chance, fiber duct were utilized as the riser conduit, then the cap 14 would be inverted from the position as shown in the drawing so that the bore 18 which is smaller than bore 19 would slip over the external diameter of the riser, which in this case would be the smaller diameter fiber duct. In this case also, the end wall 22 of the annular ring 17 would come in contact with the end of the riser. In using the cap of the instant invention, the cables 15 would be drawn through the riser conduit, and the cap 14 slipped over the ends thereof so that it would seat on the end of the riser as shown in the drawings. The cables are then allowed to settle back somewhat in the conduit so that they will assume a natural position and be somewhat self-supporting, and then some plastic compound such as Johns Manville Dux-Seal is placed around the cables such as is shown by the reference numeral 25. This compound forms a temporary joint between the cables and the cap and is also placed in between the cables.

A resin such as an epoxy resin or a standard electric cable splice filling compound 26 is poured into the bore which, in the instant embodiment, is bore 18 so that it completely fills the upper portion and, upon hardening, bonds to the cables and to the cap. The resin, therefore, not only will support the cables but also keeps out any foreign matter principally in the form of precipitation.

In order to establish the practicality of the riser cap, a set of tests were conducted comparing the thermal merits of various riser constructions. These tests proved that there was a thermal loss in a riser which possessed the ventilated cap over a riser with a sealed end.

These tests further indicated that ventilation lowers the ambient duct temperature by as much as 8° centigrade in fiber duct and 3½° C. in Transite. There is noted a difference in the duct temperatures which is undoubtedly attributable to the fact that fiber duct has a black color and Transite has a white color, the reflective properties of the two materials being exposed to sun being undoubtedly the attributing cause where the greater heat in the fiber duct created more ventilation.

The IPCEA current capacity tables give current capacities for cables operating in certain ambient temperatures. It can be shown that with assuming a lower ambient temperature of 5° C. for a 4/0 cable that the gain in allowable current is 7.3%. This assumption is a reasonable one in view of the test data obtained and proves that merely from the standpoint of ventilation the cap of the instant invention is an improvement in operating conditions for electric distribution systems.

I claim:

In combination with a conduit riser, a plurality of electric cables in said riser, a conduit riser cap mounted on the upper end of said riser, said cap having a cylindrical shell, a pair of spaced annular shoulders within said shell, said shoulders being disposed substantially normal to the wall of said shell and located substantially inwardly of the ends thereof, a plurality of bores through the wall of said shell between said shoulders, one of said shoulders engaging the end of the conduit riser, an adhesive and securing compound being adhesively bonded to the cables, the other of said shoulders supporting the adhesive and securing compound to prevent the compound from blocking said bores and insuring ventilation to the spaces between the cables in said conduit.

References Cited in the file of this patent

UNITED STATES PATENTS

| 1,283,574 | Schuster et al. | Nov. 5, 1918 |
| 1,327,382 | Garber | Jan. 6, 1920 |
| 1,914,380 | Milton | June 30, 1933 |
| 2,466,720 | Main | Apr. 12, 1949 |

FOREIGN PATENTS

| 44,035 | Norway | May 23, 1927 |